United States Patent
Kraft et al.

(10) Patent No.: US 6,755,437 B2
(45) Date of Patent: Jun. 29, 2004

(54) VEHICLE OCCUPANT PROTECTION SYSTEM HAVING A CHILD SEAT FOR A MOTOR VEHICLE

(75) Inventors: Ekkehard Kraft, Retzstadt (DE); Marten Swart, Obertraubling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/170,653

(22) Filed: Jun. 14, 2002

(65) Prior Publication Data

US 2002/0163171 A1 Nov. 7, 2002

Related U.S. Application Data

(63) Continuation of application No. PCT/DE00/04408, filed on Dec. 12, 2000.

(30) Foreign Application Priority Data

Dec. 14, 1999 (DE) .......................................... 199 60 248

(51) Int. Cl.[7] .............................................. B60R 21/32
(52) U.S. Cl. ..................... 280/735; 280/801.1; 180/273
(58) Field of Search ................................ 280/735, 734, 280/801.1; 180/271, 273; 297/250.1

(56) References Cited

U.S. PATENT DOCUMENTS

| | | | | |
|---|---|---|---|---|
| 3,745,523 A | * | 7/1973 | Lewis et al. ................. | 340/438 |
| 3,766,612 A | * | 10/1973 | Hattori ................ | 200/61.58 B |
| 3,992,028 A | * | 11/1976 | Abe et al. ................. | 280/728.1 |
| 5,468,014 A | | 11/1995 | Gimbel et al. | |
| 5,605,348 A | * | 2/1997 | Blackburn et al. .......... | 280/735 |
| 5,683,103 A | * | 11/1997 | Blackburn et al. .......... | 280/735 |
| 5,690,356 A | * | 11/1997 | Lane, Jr. ..................... | 280/735 |
| 5,851,025 A | * | 12/1998 | Gamboa ..................... | 280/735 |
| 5,882,035 A | * | 3/1999 | Munro ........................ | 280/735 |
| 5,992,879 A | * | 11/1999 | Bogge ........................ | 280/735 |
| 6,007,093 A | * | 12/1999 | Bechtle et al. ............. | 280/735 |
| 6,145,874 A | * | 11/2000 | Modzelewski et al. ..... | 280/735 |
| 6,371,516 B1 | * | 4/2002 | Miyagawa .................. | 280/735 |
| 6,419,199 B1 | * | 7/2002 | Skofljanec et al. ...... | 248/503.1 |

FOREIGN PATENT DOCUMENTS

| | | |
|---|---|---|
| DE | 197 22 734 A1 | 12/1998 |
| DE | 299 03 414 U1 | 8/1999 |
| EP | 0 819 566 A2 | 1/1998 |

* cited by examiner

*Primary Examiner*—Paul N. Dickson
*Assistant Examiner*—Deanna Draper
(74) *Attorney, Agent, or Firm*—Laurence A. Greenberg; Werner H. Stemer; Ralph E. Locher

(57) ABSTRACT

A vehicle occupant protection system for a motor vehicle includes a firing circuit, a control unit, a lockable latching device, and a sensor device. The firing circuit includes a firing cap for an airbag unit. The control unit activates the firing cap. The lockable latching device attaches a child seat. The sensor device has a switch and an electrical element connected in parallel to one another. The switch is open when the latching device is locked to prevent the firing cap from being activated. Preferably, the electrical element is a resistor. The control unit can determine an electrical resistance of the firing circuit. This is very useful when the vehicle occupant protection system includes a series of switches, each with a respective resistor connected in parallel to said second switch, because by judging the overall resistance the control unit can determine if all of the switches have been activated. The switch can include a Reed contact. The Reed contact is opened by a magnet that is positioned when the child seat is installed.

7 Claims, 2 Drawing Sheets

VEHICLE OCCUPANT PROTECTION SYSTEM HAVING A CHILD SEAT FOR A MOTOR VEHICLE

CROSS-REFERENCE TO RELATED APPLICATION

This application is a continuation of copending International Application No. PCT/DE00/04408, filed Dec. 12, 2000, which designated the United States and which was not published in English.

BACKGROUND OF THE INVENTION

1. Field of the Invention

The invention relates to a vehicle occupant protection system having a child seat for a motor vehicle including a firing circuit with a firing cap for an airbag unit, a control unit for activating the firing cap, a lockable latching device for attaching a child seat, and a sensor device which prevents the firing cap from being activated when the latching device is locked.

In terms of vehicle occupant protection in motor vehicles, the protection of children traveling in vehicles, in particular small children, is also very important. Child seats have been developed that can be attached to the front passenger seat facing backward with respect to the direction of travel so that a child sitting on the child seat is located near to the mother or father who is driving the vehicle, but in the event of an impact of the vehicle is still protected in particular by the backrest of the child seat itself. A problem that occurs with such a child seat is that an airbag located in front of the front passenger seat must not be allowed to trigger when the child seat is located on the front passenger seat. Triggering of the airbag could constitute an additional risk of injury for the child.

In order to solve this problem, the genus-forming U.S. Pat. No. 5,468,014 issued to Gimbel et al., on which the appended FIG. 4 is largely based, proposes that a sensor should be used to determine whether or that a child seat is attached to a lockable latching device and to deactivate the triggering of the airbag assigned to the front passenger seat when the latching device is locked. According to FIG. 4, latching devices 6 for receiving attachment components 10 formed on a child seat 8 are provided on a front passenger seat 2 in the rear-most region of its seat cushions 4. The latching devices 6 are rigidly connected to the frame of the front passenger seat 2, and the attachment components 10 are rigidly connected to a base frame of the child seat 8, which is embodied as a safety seat. According to Gimbel et al., sensors (not illustrated) are disposed in the latching devices 6 and are connected via lines 12 to a control unit 14 (electronic control unit). The control unit 14 actuates an airbag unit 16, which is accommodated in the region in front of the front passenger seat 2 in the dashboard 18 of the motor vehicle. The sensors (not illustrated), which are accommodated in the latching devices 6, may be embodied, for example, as pulse transmitters. The control unit 14 reacts to pulses generated by the pulse transmitters and blocks triggering of the airbag unit 16. Furthermore, the sensors may be embodied in such a way that when the attachment components 10 are not satisfactorily latched to the latching devices 6, they emit a signal that triggers a warning indicator in the dashboard.

Another possible way of generating a signal for deactivating the airbag is to accommodate transceiver mats in the front passenger seat 2 and to accommodate in the child seat 8 a transponder that reacts to a transmitted signal with a response signal which is then transmitted from the reception mat to the control unit 14 and triggers blocking of the airbag.

SUMMARY OF THE INVENTION

It is accordingly an object of the invention to provide a vehicle occupant protection system having a child seat for a motor vehicle that overcomes the hereinafore-mentioned disadvantages of the heretofore-known devices of this general type and that obtains a particularly high degree of protection against malfunctions in a simple construction.

With the foregoing and other objects in view, there is provided, in accordance with the invention, a vehicle occupant protection system for a motor vehicle includes a firing circuit, a control unit, a lockable latching device, and a sensor device. The firing circuit includes a firing cap for an airbag unit. The control unit activates the firing cap. The lockable latching device attaches a child seat. The sensor device has a switch and an electrical element connected in parallel to one another. The switch is open when the latching device is locked to prevent the firing cap from being activated. Preferably, the electrical element is a resistor. The control unit can determine an electrical resistance of the firing circuit. This is very useful when the vehicle occupant protection system includes a series of switches, each with a respective resistor connected in parallel to the second switch, because by judging the overall resistance the control unit can determine if all of the switches have been activated. The switch can include a Reed contact. The Reed contact is opened by a magnet that is positioned when the child seat is installed.

In the vehicle occupant protection system according to the invention, actuating the switch influences the effectiveness of the electrical functional element. The switch influences the trip circuit to prevent the functional element that is then electrically active from triggering the airbag.

Other features which are considered as characteristic for the invention are set forth in the appended claims.

Although the invention is illustrated and described herein as embodied in a vehicle occupant protection system having a child seat for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
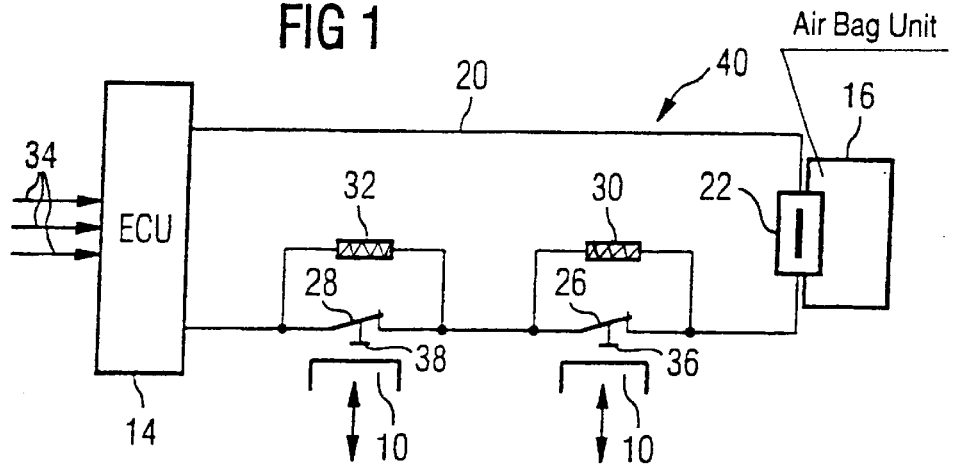
FIG. 1 is a block circuit diagram of a vehicle occupant protection system.
Figure 4:
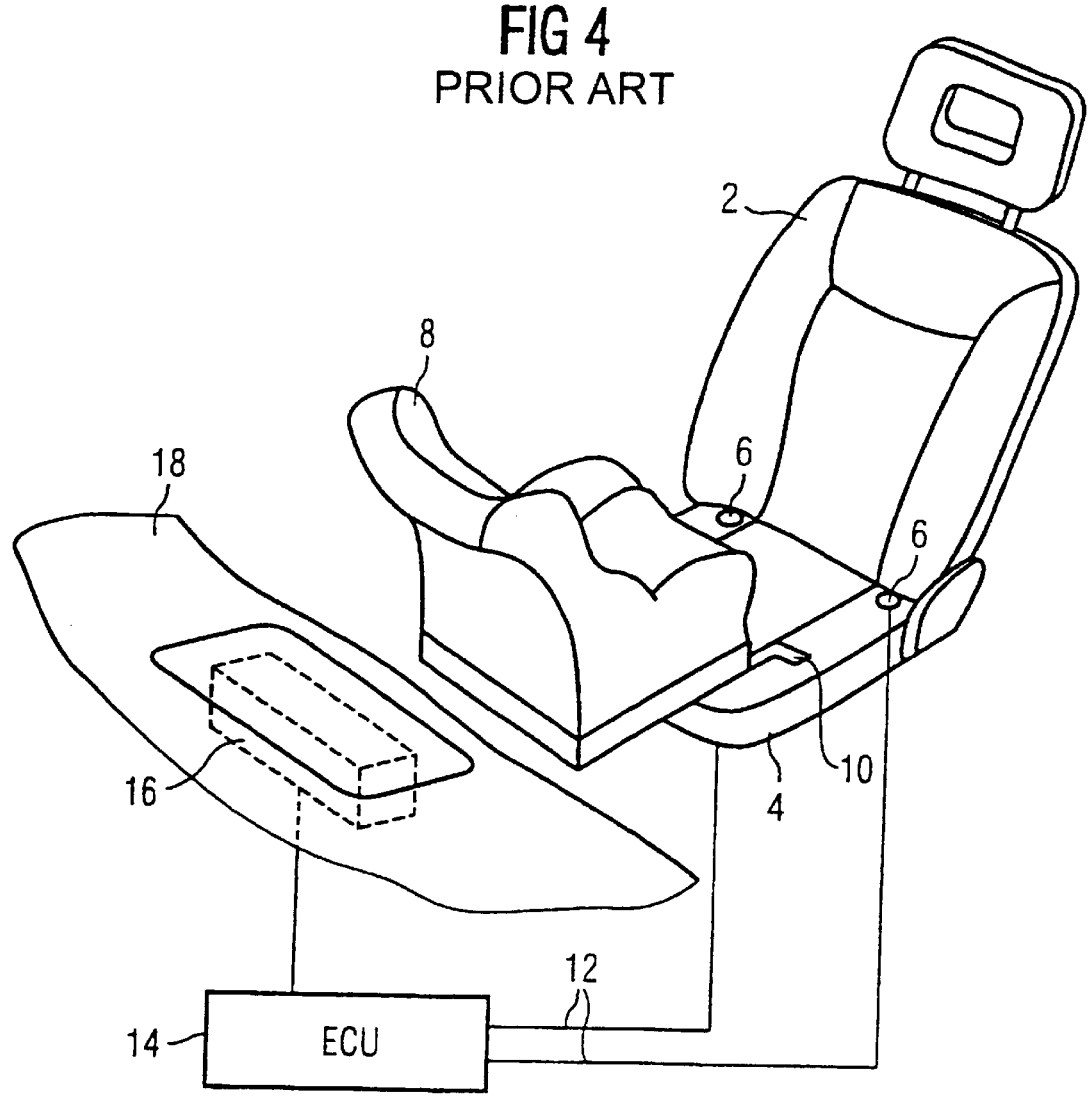
FIG. 4 is a partial perspective and partial diagrammatic view of a prior-art vehicle occupant protection.

Referring now to the figures of the drawings in detail and first, particularly to FIG. 1 thereof, there is shown a control unit (ECU) 14 is connected via a line 20 to a firing cap 22. The firing cap 22 is disposed in the airbag unit 16 according to FIG. 4. The firing cap 22 is connected to the control unit 14 via a series connection of two switches 26 and 28. Parallel to the switches 26 and 28 there are resistors 30 and 32. The circuit that is described forms a firing circuit for firing the firing cap 22. In response to signals lying at its inputs 34, the control unit 14 connects the firing circuit to a voltage source (not illustrated), for example a firing capacitor. The signals are generated, for example, by deceleration sensors and evaluated in the control unit 14. The switches 26 and 28 which are disposed within the latching devices 6 in FIG. 4 are opened with tappets 36 and 38. The tappets 36 and 38 are activated by attachment components 10 mounted on the child seat 8 (FIG. 4) when the attachment components 10 are pushed into the latching devices 6.

The configuration described functions as follows.

In the illustrated state in which the switches 26 and 28 are closed, the child seat 8 is not attached to the front passenger seat 2; i.e., the attachment components 10 do not project into the latching devices 6. The illustrated circuit then functions in a manner known per se as a customary circuit for triggering an airbag. When the firing cap 22 is connected to a corresponding voltage source (not illustrated), which is contained for example in the control unit 14, the firing cap 22 is provided with such an amount of power that pyrotechnic material for inflating the airbag (not illustrated) is fired.

When the child seat 8 is attached to the front passenger seat 2, i.e. the attachment components 10 are inserted into the latching devices 6, the tappets 36 and 38 are activated so that the switches 26 and 28 open and the series connection of the resistors 30 and 32 becomes active. This increases the resistance with which the firing cap 22 is connected to the firing power source, as a result of which the power supplied to the firing cap 22 is no longer sufficient to fire it. This thus provides a high degree of protection against mistriggerings when a child seat 8 is mounted on the front passenger seat 2. The resistance of the firing circuit, which is designated in its entirety by 40 in FIG. 1, can be continuously sensed for diagnostic purposes by the control unit 14 in a manner known per se so that a state in which only one of the switches 26 and 28 is closed can be diagnosed by the control unit 14. This can be used for a fault message displayed to the driver because it points to a hazardous state in which the child seat 8 is only inadequately attached to the front passenger seat 2.

The illustrated circuit thus not only prevents the airbag 16 from being capable of being triggered but also diagnoses the satisfactory attachment of the child seat 8.

The circuit can be modified in various ways. For example, the switches 26 and 28 with the resistors 30 and 32 that are disposed parallel to them do not need to be disposed directly in the firing circuit but rather may be disposed in a separate Safing circuit whose state is evaluated by the control unit 14. The control unit 14 evaluates the Safing circuit in such a way that, when the switches 26 and 28 are opened or the resistors 30 and 32 are active, the control unit 14 prevents a firing circuit, which directly contains the firing cap 22, from triggering.

The resistors 30 and 32, which are indicated as bridging resistors with in each case approximately 1 k in the illustrated example, do not necessarily need to be connected parallel to the switches 26 and 28. The components 30 and 32 could also be inductors or capacitors. Electrical activity of the inductors or capacitors could be sensed from outputs of the control unit 14 and changed by setting the switches 26 and 28.

For the multiple redundant functional reliability of the system that is described in FIG. 1, the switches 26 and 28 are constructed as simply as possible but yet durably and functionally reliable and that they interact with the attachment components 10.

Figure 2:
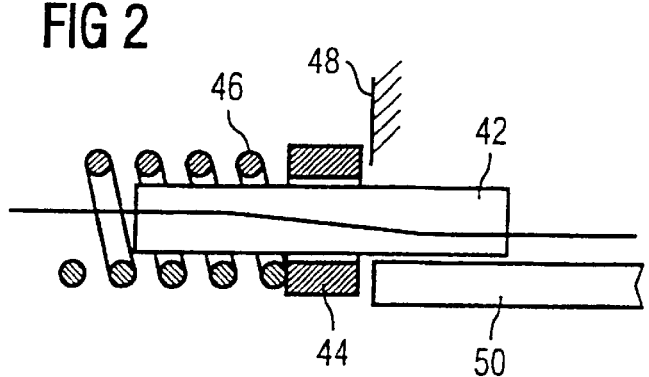
FIG. 2 is a sectional view of a switch when an attachment component is not inserted into an associated latching device.
Figure 3:
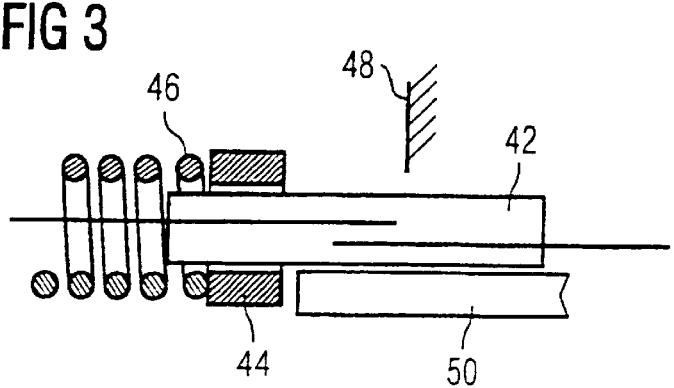
FIG. 3 is a sectional view of the switch according to FIG. 2 when an attachment component is inserted into an associated latching device.

FIGS. 2 and 3 illustrate two different switched states of a particularly advantageous embodiment of the switches.

According to FIG. 2, each of the switches has a Reed contact 42 on which a permanent magnet 44 is displaceably disposed. The permanent magnet 44 is elastically prestressed against a stop 48 by a spring 46. In the position in which the permanent magnet 44 bears against the stop 48, the Reed contact 42 is closed. An activation part 50 that interacts with the attachment component 10 (FIG. 1) is displaced from the position according to FIG. 2 into the position in FIG. 3 when an attachment component 10 (FIG. 4 or FIG. 1) is inserted into the associated latching device 6 (FIG. 1). During the displacement, it displaces the permanent magnet 44 to the left counter to the force of the spring 46 so that the Reed contact 42 opens.

The configuration in FIGS. 2 and 3 can be disposed, for example, within a rotary catch that is disposed within the latching devices 6 and locks the child seat. The invention is particularly suitable for application in modern child seats that have become known under the designation "Isofix child seat." These seats are easy to handle and can be securely latched with appropriate mechanical connections to the front passenger seat or to latching devices attached to the vehicle. The activation part 50 can also be formed directly by the attachment component 10, and that other switches than switches operating with Reed contacts can be used.

The configuration in FIGS. 2 and 3 is advantageously configured such that the permanent magnet 44 cannot be moved into the position according to FIG. 3 in which the Reed contact 42 is opened, until a latching device for mechanically locking the attachment component 10 is latched in the latching device 6, for example a rotary catch, a locking pin, etc. The attachment part 50 is therefore advantageously activated by a locking part. In this case, the latching device is advantageously constructed in such a way that it can be latched only if there is an attachment component 10 in the latching device 6, and that it cannot be moved easily into a locked position by manipulation.

The invention can be used wherever the triggering of an airbag is to be reliably prevented if an object that is put at risk by the triggering is attached in the vehicle. One or more attachments may be provided in this context.

We claim:

1. A vehicle occupant protection system for a motor vehicle, comprising:

a firing circuit with a firing cap for triggering an airbag in an airbag unit;

a control unit connected to said firing circuit for activating said firing cap;

a lockable latching device for attaching a child seat; and a sensor device connected in said firing circuit having a switch and an electrical element connected in parallel to one another, said sensor device being operably connected with said lockable latching device upon said latching device being locked, said switch being open upon said lockable latching device being locked to prevent said firing cap from being activated.

2. The vehicle occupant protection system according to claim 1, wherein said electrical element is a resistor.

3. The vehicle occupant protection system according to claim 2, wherein said control unit determines an electrical resistance of said firing circuit.

4. The vehicle occupant protection system according to claim 3, including a second switch with a respective second resistor connected in parallel to said second switch, said switches being connected in series in said firing circuit.

5. The vehicle occupant protection system according to claim 4, wherein said first and second switches are connected in series between said control unit and said firing cap in said firing circuit.

6. The vehicle occupant protection system according to claim 1, wherein said switch includes a Reed contact.

7. The vehicle occupant protection system according to claim 6, wherein said latching device includes a magnet, said magnet opening said Reed contact when the child seat is installed.

* * * * *